United States Patent Office 3,322,711
Patented May 30, 1967

3,322,711
POLYMER OXIDATION PROCESS AND
EMULSION THEREFROM
Richard W. Bush, Takoma Park, and Clifton L. Kehr,
Ednor, Md., assignors, by mesne assignments, to Allied
Chemical Corporation, New York, N.Y., a corporation
of New York
No Drawing. Filed Feb. 7, 1964, Ser. No. 343,205
6 Claims. (Cl. 260—29.6)

This invention relates to a process for oxidizing polymeric material. More particularly this invention is directed to solid state oxidation of α-olefin polymeric material to render same emulsifiable.

As used herein the term "α-olefin polymeric material" means ethylene homopolymers and copolymers of ethylene and other α-olefins wherein said copolymers contain at least 50 mole percent ethylene, said homopolymer and copolymers being at least 40% crystalline by weight and having a reduced specific viscosity of 0.1 to 30.0 deciliters/g. For purposes of description, the invention will be explained for the most part in terms of polyethylene as the α-olefin polymeric material unless otherwise noted.

In the commercial field today, emulsions of polyethylene are formed predominantly by two methods. One method is an emulsion polymerization process where the ethylene monomer is polymerized at temperatures of 80–140° C. in an aqueous media in combination with an alcohol in the presence of emulsifying agents and a free radical type catalyst e.g. potassium persulfate. The drawback to this method is that the entire output of polyethylene is in emulsion form with fixed emulsifier type and concentration thus restricting its end uses. The other emulsion-forming method employed on a wide scale is to oxidize polyethylene until sufficient carboxyl groups are present on the polymer chain and then emulsify the thus oxidized polyethylene in water at elevated temperatures using a wide variety of types of conventional emulsifying agents. In this latter method, the oxidation step used in producing all known commercial polyethylene emulsions is performed in the melt, i.e. above the melting point of the polyethylene. However, melt oxidation of polyethylene has some serious drawbacks which ultimately limit the properties of coatings, impregnates, polishes, laminates etc. resulting from these melt oxidized polyethylene emulsions. One outstanding drawback is the fact that melt oxidation, except under critically defined conditions, causes the polyethylene to crosslink during the oxidation step. Crosslinking in turn causes two additional problems, namely (1) increased viscosity due to increased molecular weight and (2) gel structure in the polymer. Melt oxidation requires that the oxygen-containing gas be diffused readily, rapidly and at high concentrations into the molten polymer. If such diffusion is not rapid, the rate of oxidation is so slow as to be impractical to accomplish on a commercial scale. Increased viscosity due to crosslinking decreases the oxygen diffusion rate and thereby decreases the rate of oxidation in the melt. Thus from a practical view point, the seriousness of this diffusion dependency on oxidation rate precludes the use of high molecular weight, i.e. above about 10,000, viscous polyethylenes as a starting material in the preparation of an oxidized polyethylene. The art, to maintain the viscosity of the molten polyethylene at a relatively low level while it is being oxidized and to avoid the predominance of the crosslinking reaction, starts with a low molecular weight polyethylene i.e. 1000–10,000 and, further, adds a very low molecular weight species of hydrocarbon such as paraffin or microcrystalline wax to the polyethylene prior to oxidation. See U.S. 2,952,649, 3,060,163, British 918,295 and French 1,323,476.

Crosslinking is a problem not only in the melt oxidation step but also in the subsequent emulsification of the thus oxidized polyethylene. Crosslinked oxidized polyethylene molecules generally are of low polarity and have gel networks that are substantially larger than the droplet size of the desired emulsions, a fact that precludes emulsification of the crosslinked polymer.

Thus there has been a long felt want of a process for oxidizing polyethylene especially of high molecular weight to an emulsifiable grade without crosslinking the polymer into a gelled or three dimensional network condition.

One object of the instant invention is to produce an emulsifiable polyethylene. Another object of this invention is a process for oxidizing polyethylene to render it emulsifiable. Still another object is to produce an emulsifiable polyethylene of high molecular weight. These and other objects of the invention will be apparent from a reading hereinafter.

Surprisingly it has been found that these objects are accomplished by oxidizing polyethylene in the solid state in an oxygen-containing atmosphere at a temperature from 90° C. up to the crystalline melting point of the polymer for a period sufficient to form 0.1 to 2.0 milliequivalents carboxyl/g. polyethylene. Oxidation of polyethylene at temperatures below its melting point precludes crosslinking of the polymer. Thus one is able to avoid the above mentioned problems of melt oxidation by the practice of this invention. For example the molecular weight of the starting polymer in solid state oxidation is not limited to low molecular weight material because of the viscosity problem encountered in melt oxidation. Nor is it necessary to add low molecular weight waxes to reduce the viscosity or inhibit cross linking in solid state oxidation. Further the oxidation rate is not reduced since crosslinking to a gelled condition does not occur and thereby increase the viscosity as in melt oxidation. Yet another advantage of solid state oxidation over melt oxidation is that the resulting oxidized polymer contains no gel and is readily emulsifiable.

This application is a continuation in part of our copending application having Ser. No. 301,189 filed Aug. 9, 1963, which in turn is a continuation in part of our application having Ser. No. 234,228 filed Oct. 30, 1962, now abandoned.

As used herein, unless otherwise specified, the term "emulsion" means a polyethylene dispersion in which water forms the continuous phase.

The term "emulsifiable α-olefin polymeric material" herein means α-olefin polymeric material as defined herein which has been oxidized in the solid state in an oxygen-containing atmosphere until it has a reduced specific viscosity in the range 0.1 to 1.5 and contains 0.10–2.0 milliequivalents carboxyl/g. oxidized polymer. Although carboxyl groups on the oxidized polymer are necessary for emulsification, other functional groups such as hydroxyl, ester and carbonyl are also present in the oxidized polyethylene. Therefore, methods have been developed for measuring these groups in a quantitative fashion. However, in addition to these groups, other oxygen-containing species are known or believed to be present in the oxidized polyethylene in somewhat lesser concentrations. Examples of these other groups would be ethers 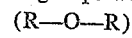 and anhydrides

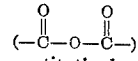

In order to measure quantitatively all of the oxygen present in the oxidized polyethylene, one must therefore resort to a direct elemental analysis of oxygen. In the products of this invention we have found by such direct analysis that the total chemically combined oxygen content may range between 0.75 to 7.0 wt. percent oxygen.

Thus the solid state oxidation of polyethylene surprisingly avoids the problems encountered in melt oxidation. In addition it is particularly noteworthy that there is no upper limit to the molecular weight of the polyethylene since there is no viscosity problem, oxygen diffusion rate problem, or crosslinking problem in solid state oxidation of the material.

In addition to being able to oxidize polyethylene having a higher molecular weight, higher density and melting point by solid state oxidation another characteristic which distinguishes the oxidized polyethylene of this invention from those of the prior art is its ability to have a high weight average molecular weight after oxidation. Presently available melt oxidized low density polyethylenes have weight average molecular weights in the range 1000 to 3200. This is due to the fact that up until the present time in order to impart sufficient polarity, especially carboxyl groups, which are considered the most important in establishing emulsifiability, it has been necessary to oxidize low density polyethylene in the melt. Oxidation in the melt requires low molecular weight starting polymer to avoid the problem of crosslinking and to provide a sufficiently fluid medium as aforementioned herein. Melt oxidation of low density polyethylene thus results in final oxidized polymers of extremely low molecular weight i.e. 1000–3200. It has now been found, surprisingly, that these problems are not encountered when the oxidation is carried out in the solid state. High density polyethylene (0.95–0.98 g./cc.) with a crystalline melting point in the range 120–137° C. is readily oxidized at temperatures below its melting point i.e. 100–135° C. Low density polyethylene (0.91–0.93 g./cc.) having a melting point in the range 95–110° C. and medium density polyethylene (0.93–95 g./cc.) having a melting point in the range 110–120° C. are also readily oxidized in the solid state at temperatures in the range 90–115° C. Thus by employing solid state oxidation, the problems of crosslinking and high melt viscosity are eliminated and polyethylene of any desired molecular weight e.g. up to 2,000,000 or more i.e. having a reduced specific viscosity (RSV) of 0.1 to 30 deciliters/g. can be employed as the starting polymer.

Although considerable reduction in molecular weight occurs during oxidation, the molecular weight of the final solid state oxidized polyethylene is substantially higher than the melt oxidized polyethylene. This is true because the starting polymer can be of higher molecular weight. Thus the process of this invention permits one to obtain the novel and unique combination of high polarity and high molecular weight within oxidized polyethylene of any desired density e.g. 0.910–0.98 g./cc. before oxidation, i.e. 0.93–1.05 after oxidation. This is a composition heretofore not attainable by the art. Oxidized polyethylenes having a higher molecular weight at a given density have higher tensile strength, flexibility and abrasion resistance, properties which are very desirable in coatings, laminates, impregnates, etc. resulting from application of the oxidized polyethylene per se or in emulsion form.

It is critical in practicing the instant invention that the oxidation step, used to form the requisite amount of carboxyl in the polymer, be performed in the solid state at a temperature ranging from 90° C. up to but not including the crystalline melting point of the polyethylene. If temperatures above the melting point of the polymer are used, the problems of cross-linking and high melt viscosity are encountered thereby requiring the oxidation period to be extended 4 or more fold in order to obtain the required carboxyl range i.e. 0.1 to 2.0 milliequivalents/g. polymer. Additionally, on a commercial scale, it is extremely difficult to handle highly viscous molten polymers. On the other hand, if oxidation temperatures below the lower limit of the critical range are used, the oxidation period is approximately doubled for each ten degree drop in temperature. The oxidation step is performed within the critical range as close as practical to the melting point of the polyethylene in order to obtain maximum oxidation rates. Thus the higher the melting point of the polyethylene, the higher the oxidation temperature employed within the critical limit. Present day high density polyethylenes have melting points in the approximate ranges 120–137° C., medium density polyethylenes in the range 110–120° C. and low density polyethylene in the range 95–110° C. When ethylene containing copolymers are used the approximate melting point ranges lie between 95° C. and 131° C. depending on which α-olefin and the amount thereof is used in the copolymer. The oxidation step is carried on until the required carboxyl content necessary for emulsification is present, i.e., 0.1 to 2.0 meq. COOH/g. polymer.

Polyethylene can be readily oxidized in the solid state by various methods to give polymers containing carboxyl groups. The techniques for introducing carboxyl groups into polyethylene are exemplified by, but not limited to, the following methods. One method would include passing oxygen-containing gas into an oven over a solid polyethylene therein at a temperature below the crystalline melting point of the polymer, e.g. 90–135° C. Still another method would be to suspend particles of polyethylene in water or an inert organic solvent and either bubble air through the suspension or pressurize the system with air at temperatures ranging from 90° C. up to the crystalline melting point of the polymer. Yet another method would be to pass an oxygen-containing gas at a temperature from 90° C. up to the crystalline melting point of the polymer through a fluidized bed of polyethylene particles. A further method would include pressing the polyethylene into film and thereafter passing hot air or other oxygen containing gas thereover at a temperature of 90° C. up to the crystalline melting point of the polymer. A still further method would be to tumble polyethylene crumb in air in a ribbon blender at temperatures of 90° C. up to the crystalline melting point of the polyethylene.

In all the aforesaid methods of oxidizing polyethylene, if desired, a minor amount i.e. 0.05 to 5% by weight of the polyethylene of an organic peroxide, ozone, nitrogen tetroxide or other oxidation promoter may be blended with the polymer to eliminate the induction period and increase the oxidation rate. Superatmospheric pressure may be used if desired in any of the oxidation methods employed including those aforesaid.

The polyethylene operable in this invention can be produced by many methods well known in the art. For example polyethylene having a density of 0.930–0.980 can be obtained using the Phillips catalyst system, i.e. chromium oxide on a $SiO_2$-$Al_2O_3$ support wherein at least part of the chromium is in the hexavalent state. The polymerization is performed at temperatures of 60–260° C. See U.S. 2,825,721. Another catalyst system capable of forming the high density polyethylene used herein is disclosed in U.S. 2,816,883. Yet another catalyst system consisting essentially of vanadium oxytrichloride and ethyl aluminum dichloride will yield high density polyethylene having a melt index less than 0.01. Still another catalyst system yielding very high molecular weight polyethylene having a melt index less than 0.01 and a density of about 0.96 comprises $TiCl_3$ and diethyl aluminum chloride. A still further method of producing high density polyethylene is the Ziegler process wherein the catalyst consists essentially of compounds of metal of Groups IV–B, V–B, and VI–B and an aluminum trialkyl compound as set out in Belgian Patent 533,362 issued to K. Ziegler. Yet another method of forming high density polyethylene operable herein is disclosed in U.S. 2,949,447. Other methods of producing polyethylene with a density in the range 0.930–0.980 are well known to those skilled in the art. Conventional branched low density polyethylene 0.91–0.93 g./cc. can be prepared in accord with British 471,590 or U.S. 2,153,553 as well as other well known methods.

The copolymers operable in the instant invention can be formed by the methods taught in U.S. 2,825,721 and in Belgian Patents 543,259 and 538,782.

The polyethylenes operable in the instant invention have a density in the range 0.91–0.98 g./cc. and a melting point in the range 95–137° C. prior to the oxidation step. However the density of the polymer increases as the extent of oxidation increases. This is the result of the substitution of heavier oxygen atoms (atomic weight 16.0) in the polymer in place of hydrogen (atomic weight 1.008) without substantial disruption of the crystalline matrix. Consequently the density ranges of the oxidized products of this invention lie between 0.930 and 1.050 g./cc., the exact value in any instance depending on the initial density of the starting polymer, and the extent of oxidation.

The general procedure for performing the present invention is to oxidize the polyethylene, preferably in particulate form, in a suitable apparatus, e.g. a forced draft oven by passing an oxygen-containing gas, e.g. air, over the polymer while the polymer is being heated at temperatures ranging from 90° C. up to the crystalline melting point of the polymer.

If desired the oxidation induction period can be decreased by admixing the high density polyethylene with an oxidation promoter e.g. an organic peroxide (usually 0.05 to 5.0% peroxide by weight of polymer) in a suitable mixing mechanism, e.g. Twin Shell blender, at room temperature. Preferably the organic peroxide is solubilized in a hydrocarbon solvent which solvent is thereafter evaporated prior to the oxidation step. Solubilizing the peroxide in a solvent insures more uniform dispersion of the peroxide throughout the polymer. Various solvents for the peroxide are operable and the selection of a suitable one is governed by its solvent power on the peroxide or other oxidation promoter employed and its inertness thereto. Operable solvents are well known to those skilled in the art and include volatile aromatic and aliphatic hydrocarbons such as benzene, toluene, pentane, and hexane.

The thus blended polymer-peroxide mixture is then subjected to oxidation as aforestated. If ozone is used as a promoter, it is incorporated into the oxygen-containing gas stream. Since the rate of oxidation increases with increasing temperature, it is preferred to carry out the oxidation at as high a temperature as possible without melting the polymeric material. Thus temperatures within 5–20° C. below the crystalline melting point of the polymer are usually employed.

The oxidized polyethylene of the present invention has a reduced specific viscosity (RSV) in the range 0.1 to 1.5 and a carboxyl content of 0.1–2.0 milliequivalents/g. polymer.

It has been found that the reduced specific viscosity of the oxidized polymer can be maintained above 0.1 even at the higher ranges of carboxyl content provided the starting polymer is of sufficiently high molecular weight. In general polyethylene operable in the instant invention, has a weight average molecular weight in the range 1,000 to 2,000,000 or more calculated from fractionation data in accord with the procedure in "Techniques of Polymer Characterization," P. W. Allen, p. 3, Academic Press Inc., New York, N.Y. (1959). In regard to the lower limit of the range, care must be exercised that the oxidation does not degrade the polymer to the extent that improved properties which are partially afforded by high molecular weight e.g. high tensile strength and abrasion resistance are not obtained.

The oxidation step can be terminated at any operable degree of oxidation within the limits of the carboxyl content and if desired subsequently stabilized. For example, a suitable anti-oxidant such as 4,4′thiobis (6-t-butyl-metacresol) sold under the tradename "Santonox" by Monsato Chemical Company or N-phenyl-2-naphthylamine can be added to the oxidized polyethylene. However stabilization of the oxidized polymer generally is only required to obtain accurate melt index measurements. In actual practice for most applications the oxidized polymer need not be stabilized.

The oxidized polyethylene of the instant invention wherein the carboxyl content is 0.1 to 2.0 milliequivalents/gm. polyethylene is readily emulsified in a continuous aqueous phase in the presence of suitable well known emulsifiers. Both ionic and non-ionic emulsifying agents are operable to emulsify the oxidized polymer. Ionic emulsifiers include, in the anionic class, amine salts of fatty acids. Morpholine, monoethanol amine, 2-amino-2-methyl-1-propanol and the like are suitable amines. Operable fatty acids include oleic, stearic, palmitic, myistic and the like higher fatty acids. Sodium, potassium and ammonium salts of the fatty acids are also operable. Salts of alkyl aryl sulfonic acids have also been used as emulsifying agents with good results. Operable ionic emulsifiers in the cationic class include but are not limited to acetate salts of long chain aliphatic amines and of long chain imidazolines. Polyoxyethylene esters of fatty acids, polyoxyethylene derivatives of sorbitants or of fatty acid substituted sorbitans, polyoxyethylene ethers of long chain alcohols, polyoxyethylene ethers of alkyl aryl phenols or combinations thereof are examples of a few nonionic emulsifiers operable in this invention. The amount of emulsifier employed is from 1 to 50 parts, preferably 4 to 30 parts emulsifier/100 parts oxidized polyethylene by weight.

Base must be added to the anionic and nonionic emulsions in an amount in the range from 40 to 200% of the theoretical amount required to neutralize the carboxylic acid groups on the polymer. When anionic emulsifiers such as amine salts of fatty acids are used, one generally adds an excess of the amine moiety to serve as the base.

The aqueous emulsions of the instant invention contain 10–50% total solids by weight. The oxidized polyethylene, emulsifier, base, and water are combined in any order in a pressure reactor equipped with an efficient stirrer. Air is evacuated and the reactor sealed. The mixture is heated with vigorous stirring to a temperature ranging from the melting point of the oxidized polyethylene up to 200° C. (preferably 110–160° C.) and maintained thereat for periods ranging from 5 minutes to 5 hours under the pressure of the system. In some cases of emulsifying oxidized polyethylene the "wax-to-water" method of emulsification can be used alternatively if desired. In said method, the oxidized polyethylene and emulsifier are heated together at about 120° C. The base is added thereto and the resulting mixture is poured into vigorously stirred water at about 90–100° C. for emulsification. The thus formed emulsion is cooled to room temperature with stirring. Examples of emulsifying the oxidized polyethylene of the instant invention will be given hereinafter.

The following examples are set down to illustrate the invention and are not deemed to limit its scope. Throughout the instant invention tests were conducted as follows:

The extent of oxidation of the polyethylene was determined by ascertaining the percent carbonyl of the oxidized polymer by measuring the intensity of infrared absorption at 1720 cm.$^{-1}$ assuming an absorbance characteristic of ketone type carbonyl. In actuality, other carbonyl containing functions such as aldehyde, carboxylic acid and carboxylate ester also contribute to the 1720 cm.$^{-1}$ absorption. Therefore, the values reported as percent carbonyl represent a composite of all of these groups. Measurements were made on a Perkin-Elmer Spectrophotometer, Model 221. The reported percent carbonyl is defined as $$\frac{\text{gms. C=O}}{\text{gms. polymer}} \times 100$$

As an alternative method the extent of oxidation of polyethylene was determined by ascertaining the carboxyl content of the polymeric material by titration with base in the following manner. About 1 g. of the polymer to be analyzed was accurately weighed and dissolved in 100 ml. of xylene by heating to 120–130° C. with stirring in a 500 ml. Erlenmeyer flask on a magnetic stirrer-hot plate. About 10–20 drops of 0.1% thymol blue in absolute ethanol was added. While continuing stirring and maintaining the temperature at 120–130° C., the solution was titrated to a blue end point with standard 0.1 N potassium hydroxide in absolute ethanol.

Calculation:

Milliequivs. COOH per gram =
$$\frac{(\text{ml. of KOH})(N \text{ of KOH})}{(\text{g. of polymer})}$$

Melt indices (MI) were measured under the conditions specified in ASTMD 1238–57T under Condition E (melt index, i.e. MI) and Condition F (high load melt index, i.e. HLMI).

Densities of the polymer in g./cc. were measured under the conditions specified in ASTMD 1505–57T.

Reduced specific viscosity, i.e. RSV, in deciliters/g. was obtained by dissolving 0.1 g. of the polymer for RSV's of 10 and under and 0.02 g. of the polymer for RSV's over 10 in 100 cc. Decalin at 135° C. in accord with the procedure of ASTMD 1601–61.

The percent gel content of the polymer in the instant invention was measured by refluxing a weighed sample (approximately 0.5 g.) of polymer in a cellulose Soxhlet thimble in xylene (containing 0.3 weight percent, 2,6-ditertiary-butyl-4-methyl-phenol commercially available under the tradename "Ionol" from Shell Oil Corp.) for 24 hours. The insoluble portion of the polymer sample after drying was weighed to calculate percent gel as follows:

$$\text{Percent gel} = \frac{\text{weight insoluble sample}}{\text{total weight sample}} \times 100$$

The crystalline melting point of the polymer was measured as the temperature at which birefringence disappears from the sample when viewed through crossed Nicol prisms in a hot stage microscope heated at a rate of 1° C./min.

The viscosity of the polyethylene emulsions was measured at 23° C. with a Brookfield Viscometer Model LVT using Spindle No. 1 at 60 r.p.m.

The percent of the oxidized polyethylene which is emulsified is measured by filtering the emulsion through a 100 mesh screen at 25° C.

Percent emulsified =
$$\left(1 - \frac{\text{grams oxidized polymer retained on 100 mesh screen}}{\text{total grams oxidized polymer employed in recipe}}\right) 100$$

X-ray crystallinity was measured according to the method in Acta Crystallographic 2, 85–90 (1949) by J. L. Mathews, H. S. Peiser and R. B. Richards entitled, "The X-ray Measurement of the Amorphous Content of Polythene Samples."

Total combined oxygen content of the oxidized polyethylene was determined by the method of J. Unterzaucher, Ber, 1940, 73, 391.

Unless otherwise noted, all parts and percentages are by weight.

Example 1

150 lbs. of commercially available polyethylene having a reduced specific viscosity of 4.5, a density of 0.95 g./cc. and a crystalline melting point of 135° C. were charged to a ribbon blender and heated therein at 118–122° C. in a gas mixture consisting of 90% oxygen and 10% nitrogen by volume for 29½ hours. On characterization the oxidized polyethylene product had a melt index of 3300, a reduced specific viscosity of 0.29, a density of 1.00, a carbonyl content of 1.8 wt. percent and a carboxyl content of 0.47 milliequivalent/g. oxidized polyethylene.

Example 2

49 pounds of commercially available polyethylene having a density of 0.95, a crystalline melting point of 135° C., a reduced specific viscosity of 4.5 and a melt index of 0.0 was coated with 0.5% benzoyl peroxide by weight and oxidized in air in a Stokes vacuum dryer for 24 hours at 120–121° C. The thus oxidized polyethylene on characterization had a density of 0.990, a melt index of 375, a reduced specific viscosity (RSV) of 0.4, a melting point of 129° C. and contained 0.51 milliequivalents of carboxyl/gm. polymer and 2.2 wt. percent carbonyl.

To show the emulsifiability of the oxidized polyethylene of the instant invention the following run was made.

Example 3

To a 2 quart "Chemco" Stirred Reactor equipped with a high speed air stirrer was charged 450 parts water, 100 parts of oxidized polyethylene from Example 2, 3.9 parts of a 32% KOH solution and 31 parts of a non-ionic emulsifier, i.e. a polyoxyethylene nonylphenol ether sold under the tradename "Renex 697" by Atlas Chemical Industries, Inc. Air was evacuated from the reactor and the reactor was sealed. Vigorous stirring was commenced and the reactor was heated to 150° C. The mixture was maintained at 150–152° C. and 55 p.s.i.g. for 30 minutes with vigorous stirring. Stirring was continued while the thus formed emulsion was cooled to room temperature. The resulting stable emulsion had a viscosity of 6.0 centipoises at 23° C. when measured with a Brookfield Viscometer Model LVT using Spindle No. 1 at 60 r.p.m. The starting oxidized polyethylene was shown to be 99% emulsified when filtered through a 100 mesh screen at 25° C.

Example 4

70 lbs. of commercially available polyethylene having a density of 0.940, a crystalline melting point of 135° C. and a reduced specific viscosity of 15.5 were coated with 0.5% benzoyl peroxide by weight and oxidized in a Stokes vacuum dryer for 24 hours at 122° C. The thus oxidized polymer on characterization contained 1.6 weight percent carbonyl and 0.37 milliequivalent carboxyl/per gram of oxidized polymer and had a melt index of 9 and an RSV or 0.77. 100 parts of the oxidized polyethylene along with 5.2 parts of a 32% KOH solution, 31 parts "Renex 697" and 450 parts distilled water were charged to a 2 quart "Chemco" Stirred Reactor. Air was evacuated from the reactor and the reactor was sealed. Agitation was started and the reactor heated to 150° C. After 30 minutes at 150° C. and 55 p.s.i.g., the reactor was cooled with continued stirring. The resulting emulsion contained 21.6% solids. The starting oxidized polyethylene was 99% emulsified.

Example 5

500 gms. of an ethylene-butylene copolymer (0.8 mole percent butene-1) having a melt index of 0.0 and a high load melt index of 1.7. a density of 0.94, a crystalline melting point of 125° C. and a reduced specific viscosity of 4.7 were coated with 0.5% by weight benzoyl peroxide and oxidized for 23 hours at 110° C. in a rotating glass drum. The oxidized copolymer had a melt index of 760, an RSV of 0.4, a melting point of 125° C. and contained 0.34 milliequivalent carboxyl/gm. copolymer. 100 parts of the thus-oxidized copolymer were charged to a 2 quart "Chemco" Stirred Reactor along with 31 parts "Renex 697" (emulsifying agent), 6.5 parts of 32% KOH and 450 parts water. The reactor was sealed and heated to 150–153° C. and 56–60 p.s.i.g. pressure while the 30 minute emulsification was carried out with vigorous stirring. The resulting stable emulsion was cooled with stirring and on characterization had a percent total solids of 21.5, a viscosity of 7.0 and a pH of 10.5. The starting oxidized copolymer was 99% emulsified.

Example 6

600 grams of a medium density ethylene-butylene copolymer having 0.931 g./cc. density, an RSV of 2.3 and a crystalline melting point of 122–127° C. was ground to an average particle size below 1 mm., and coated with 0.5% benzoyl peroxide (based upon the weight of the polymer) applied as a benzene solution. The benzene was evaporated. The polymer was heated at 107–110° C. for 52 hr. in a creased rotating glass sphere with a heated oxygen stream passing over the polymer. The oxidized product had an RSV of 0.27, a crystalline melting point of 124–125° C., and contained 0.39 milliequivalent of carboxyl per gram. 100 parts of the product was readily emulsified at 150° C. under 55 p.s.i.g. pressure with stirring with 31 parts of "Renex 697," 5.6 parts of 32% KOH and 450 parts of water, to give a very stable, low particle size oxidized polyethylene dispersion. The starting oxidized copolymer was 100% emulsified.

Example 7

800 grams of a commercial polyethylene powder (particles less than 1 mm.) having a reduced specific viscosity of 0.7 and a crystalline melting point of 115–117° C. was coated with 0.5% benzoyl peroxide (based upon the weight of the polymer) applied as a benzene solution. The benzene was evaporated. The polymer was heated at 100–105° C. for 100 hours as in Example 6. The product had an RSV of 0.32, a crystalline melting point of 111–114° C. and contained 0.24 milliequivalent of carboxyl per gram. 100 parts of the polymer was readily emulsified at 150° C. under pressure with 31 parts of "Renex 697," 3.5 parts of 32% KOH and 450 parts of water to give a very stable, low particle size oxidized polyethylene emulsion. The starting oxidized polymer was 100% emulsified.

To show the operability of solid state oxidation to produce emulsifiable polyethylene as compared with melt oxidation, the following comparative examples were performed.

Example 8

1000 g. of commercially available polyethylene in flake form having a density of 0.958, a reduced specific viscosity of 1.5, a melt index of 4.1 and a crystalline melting point of 135° C. was coated with a benzene solution containing 0.5% benzoyl peroxide by weight of the polymer and oxidized in the solid state in a rotating glass reactor for 40½ hours at 120° C. with air preheated to 120° C. being passed over the polymer. The resulting oxidized polymer had a melt index of 880, an RSV of 0.49, and a carboxyl content of 0.37 milliequivalent/g. polymer. 100 parts of the thus oxidized polyethylene, 31 parts of a polyoxyethylene ether of nonyl phenol sold under the tradename "Renex 697," 8.5 parts of a 32% KOH aqueous solution and 450 parts of water were charged to a 2 quart "Chemco" Stirred Reactor capable of withstanding 100 p.s.i. pressure. The mixture was heated for 30 minutes at 150° C. and stirred at 1000 r.p.m. during emulsification. The resulting emulsion was cooled to room temperature (25° C.) with continued stirring. The resultant stable emulsion contained 20.4% solids and had a viscosity of 16 centipoises at 23° C. The starting solid state oxidized polyethylene proved to be 100% emulsified when filtered through a 100 mesh screen at 25° C.

Example 9

200 g. of commercially available polyethylene in flake form having a density of 0.958, a reduced specific viscosity of 1.5, a melt index of 4.1 and a crystalline melting point of 135° C. were weighed into an aluminum dish and melt oxidized in a circulating air oven at 160° C. for 141 hours. At this temperature, the polyethylene melted to form a 0.25 in. thick layer of molten polymer in the dish. The thus oxidized polyethylene on characterization had a carboxyl content of 0.48 milliequivalent/g. polymer, a melt index of 0.2 and a gel content of 14% as measured in refluxing xylene. 100 g. of the thus oxidized polyethylene was subjected to emulsification using the procedure and reactants of Example 8 except for the oxidized polyethylene. The melt oxidized polymer would not emulsify and greater than 80 wt. percent of the charged polyethylene was recovered unemulsified by filtration through a 100 mesh screen at 25° C.

A comparison of Example 8 (solid state oxidation) and Example 9 (melt oxidation) shows that even though the requisite carboxyl is present to render polyethylene emulsifiable in both examples, only the solid state oxidized polyethylene was actually emulsifiable. This is due to the melt oxidized polyethylene being non-uniformly oxidized and crosslinked (14% gel content and lower melt index) which limits emulsifiability of the oxidized polymer to a considerable extent.

Example 10

1900 g. of commercially available polyethylene pellets having a density of 0.92, a reduced specific viscosity of 1.0, a melt index of 4.9 and a crystalline melting point of 111° C. was coated with a benzene solution containing 0.4% benzoyl peroxide by weight of the polymer and oxidized in the solid state in a rotating glass reactor for 139 hrs. at 99–103° C. with oxygen being passed over the polymer. The resulting oxidized polymer had a melt index of 2600, an RSV of 0.32, and a carboxyl content of 0.30 milliequivalent/g. polymer. 100 parts of the thus oxidized polyethylene, 31 parts of a polyoxyethylene ether of nonyl phenol sold under the tradename "Renex 697," 5.2 parts of a 32% KOH aqueous solution and 450 parts of water were charged to a 2 quart "Chemco" Stirred Reactor capable of withstanding 100 p.s.i. pressure. The mixture was heated for 30 minutes at 150° C. and stirred at 1000 r.p.m. during emulsification. The resulting emulsion was cooled to room temperature (25° C.) with continued stirring. The resultant stable emulsion contained 19.9% solids and had a viscosity of 37 centipoises at 23° C. The starting solid state oxidized polyethylene proved to be 100% emulsified when filtered through a 100 mesh screen at 25° C.

Example 11

200 g. of commercially available polyethylene pellets having a density of 0.93, a reduced specific viscosity of 1.0, a melt index of 4.4 and a crystalline melting point of 111° C. were weighed into an aluminum dish and melt oxidized in a circulating air oven at 160° C. for 141 hrs. At this temperature, the polyethylene melted to form a 0.25 in. thick layer of molten polymer in the dish. The thus oxidized polyethylene on characterization had a carboxyl content of 0.32 milliequivalent/g. polymer, a melt index of 2.1 and a gel content of 19% in refluxing xylene. 100 g. of the thus oxidized polyethylene was subjected to emulsification using the procedure and reactants of Example 10 except for the oxidized polyethylene. The melt oxidized polymer would not emulsify and greater than 80 wt. percent of the charged polyethylene was recovered unemulsified by filtration through a 100 mesh screen at 25° C.

A comparison of Example 10 (solid state oxidation) and Example 11 (melt oxidation) shows that even though sufficient carboxyl content to render low density polyethylene emulsifiable is present in both examples, only the solid state oxidized polyethylene was actually emulsifiable. This is due to the melt oxidized polyethylene being non-uniformly oxidized and crosslinked (19% gel content and lower melt index) which limits emulsifiability of the oxidized polymer to a considerable extent.

Example 12

500 g. of commercially available polyethylene in flake form having a density of 0.958, a reduced specific viscosity of 2.2, a melt index of 0.7 and a crystalline melting point of 135° C. was placed in an aluminum tray and oxidized in the solid state in a circulating air oven for 55 hrs. at 128° C. The resulting oxidized polymer had a melt index of 1570, an RSV of 0.31, and a carboxyl content of 0.53 milliequivalent/g. polymer. 100 parts of the thus oxidized polyethylene, 31 parts of a polyoxyethylene ether of nonyl phenol sold under the tradename "Renex 697," 7.6 parts of a 32% KOH aqueous solution and 450 parts of water were charged to a 2 quart "Chemco" Stirred Reactor capable of withstanding 100 p.s.i. pressure. The mixture was heated for 30 minutes at 150° C. and stirred at 1000 r.p.m. during emulsification. The resulting emulsion was cooled to room temperature (25° C.) with continued stirring. The resultant emulsion was stable and had low particle size. The starting solid state oxidized polyethylene proved to be 100% emulsified when filtered through a 100 mesh screen at 25° C.

What is claimed is:
1. An aqueous emulsion composition comprising (a) emulsifiable oxidized α-olefin polymeric material, said material prepared by oxidizing in the solid particulate state as essentially the sole solid hydrocarbon material an α-olefin polymeric material selected from the group consisting of ethylene homopolymers and copolymers of ethylene and other α-olefins wherein said copolymers containing at least 50 mole percent ethylene, said homopolymer and copolymers being at least 40% crystalline by weight and having a reduced specific viscosity of 1.0 to 30 deciliters/g., in an atmosphere containing free oxygen at a temperature ranging from 90° C. up to the crystaline melting point of the α-olefin polymeric material for a period sufficient to form oxidized α-olefin polymeric material containing 0.1 to 2.0 milliequivalents carboxyl/g. and having a reduced specific viscosity of 0.1 to 1.5 deciliters/g. (b) from 40–200% by weight of the theoretical amount of a base required to neutralize the carboxylic acid groups in said material, (c) 1–50% by weight of said material of an emulsifier, (d) said aqueous emulsion containing 10 to 50% total solids by weight.

2. An aqueous emulsion composition comprising (a) oxidized emulsifiable polyethylene, said polyethylene prepared by oxidizing in the solid particulate state as essentially the sole solid hydrocarbon material polyethylene having a reduced specific viscosity of 1.0 to 30 deciliters/g., in an atmosphere containing free oxygen at a temperature ranging from 90° C. up to the crystalline melting point of the polyethylene for a period sufficient to form oxidized polyethylene containing 0.1 to 2.0 milliequivalents carboxyl/g. and having a reduced specific viscosity of 0.1 to 1.5 deciliters/g., (b) from 40–200% by weight of the theoretical amount of a base required to neutralize the carboxylic acid groups in said polyethylene, (c) 1–50% by weight of said polyethylene of an emulsifier, (d) said aqueous emulsion containing 10 to 50% total solids by weight.

3. The process of preparing an aqueous emulsion which comprises admixing (a) oxidized emulsifiable α-olefin polymeric material, said material prepared by oxidizing in the solid particulate state as essentially the sole solid hydrocarbon material an α-olefin polymeric material selected from the group consisting of ethylene homopolymers and copolymers of ethylene and other α-olefins wherein said copolymers contain at least 50 mole percent ethylene, said homopolymer and copolymers being at least 40% crystalline by weight and having a reduced specific viscosity of 1.0 to 30 deciliters/g., in an atmosphere containing free oxygen at a temperature ranging from 90° C. up to the crystalline melting point of the α-olefin polymeric material for a period sufficient to form oxidized α-olefin polymeric material containing 0.1 to 2.0 milliequivalents carboxyl/g. and having a reduced specific viscosity of 0.1 to 1.5 deciliters/g., (b) from 40–200% by weight of the theoretical amount of a base required to neutralize the carboxylic acid groups in said material, (c) 1–50% by weight of said material of an emulsifier, and (d) sufficient water for said aqueous emulsion to contain 10 to 50% total solids by weight, and thereafter emulsifying said mixture at a temperature ranging from the melting point of said α-olefin polymeric material up to 200° C. at a pressure sufficient to maintain the aqueous mixture in the liquid phase.

4. The process of preparing an aqueous emulsion which comprises admixing (a) oxidized emulsifiable polyethylene, said polyethylene prepared by oxidizing in the solid particulate state as essentially the sole solid hydrocarbon material polyethylene having a reduced specific viscosity of 1.0 to 30 deciliters/g. in an atmosphere containing free oxygen at a temperature ranging from 90° C. up to the crystalline melting point of the polyethylene for a period sufficient to form oxidized polyethylene containing 0.1 to 2.0 milliequivalents carboxyl/g. polyethylene, (b) from 40–200% by weight of the theoretical amount of a base required to neutralize the carboxylic acid groups in said polyethylene, (c) 1–50% by weight of said polyethylene of an emulsifier, (d) said aqueous emulsion containing 10 to 50% total solids by weight and thereafter emulsifying said mixture at a temperature ranging from the melting point of said polyethylene up to 200° C. at a pressure sufficient to maintain the aqueous mixture in the liquid phase.

5. An aqueous cationic emulsion composition comprising (a) oxidized emulsifiable polyethylene, said polyethylene prepared by oxidizing in the solid particulate state as essentially the sole solid hydrocarbon material polyethylene having a reduced specific viscosity of 1.0 to 30 deciliters/g. in an atmosphere containing free oxygen at a temperature ranging from 90° C. up to the crystalline melting point of the polyethylene for a period sufficient to form oxidized polyethylene containing 0.1 to 2.0 milliequivalents carboxyl/g. and having a reduced specific viscosity of 0.1 to 1.5 deciliters/g., (b) 1–50% by weight of said polyethylene of an emulsifier, (c) said aqueous emulsion containing 10 to 50% solids by weight.

6. An emulsion in accordance with claim 1 in which the oxidized polyethylene has a reduced specific viscosity between 0.27 to 1.5 and contains 0.24 to 2.0 milliequivalents carboxyl/g.

References Cited
UNITED STATES PATENTS

| | | | |
|---|---|---|---|
| 2,879,240 | 3/1959 | De Groote et al. | 260—29.6 |
| 2,879,241 | 3/1959 | De Groote et al. | 260—29.6 |
| 2,995,533 | 8/1961 | Parmer et al. | 260—29.6 |
| 3,155,644 | 11/1964 | Kehr | 260—94.9 |
| 3,160,621 | 12/1964 | Hagemeyer et al. | 260—94.9 |
| 3,213,043 | 11/1965 | Kehr | 260—94.9 |

MURRAY TILLMAN, *Primary Examiner.*

J. L. WHITE, *Assistant Examiner.*